United States Patent [19]
Han et al.

[11] Patent Number: 5,866,805
[45] Date of Patent: Feb. 2, 1999

[54] CANTILEVERS FOR A MAGNETICALLY DRIVEN ATOMIC FORCE MICROSCOPE

[75] Inventors: Wenhai Han; Stuart M. Lindsay; Tianwei Jing, all of Tempe, Ariz.

[73] Assignee: Molecular Imaging Corporation Arizona Board of Regents, Tempe, Ariz.

[21] Appl. No.: 710,191

[22] Filed: Sep. 12, 1996

Related U.S. Application Data

[60] Contintinuation-in-part of Ser. No. 553,111, Nov. 7, 1995, Pat. No. 5,612,491, which is a division of Ser. No. 403,238, Mar. 10, 1995, Pat. No. 5,513,518, which is a continuation-in-part of Ser. No. 246,035, May 19, 1994, Pat. No. 5,515,719.

[51] Int. Cl.⁶ ...................................................... G01B 5/28
[52] U.S. Cl. .................................................................. 73/105
[58] Field of Search .............................. 73/105; 250/306, 250/307

[56] References Cited

U.S. PATENT DOCUMENTS

| | | |
|---|---|---|
| Re. 33,387 | 10/1990 | Binnig . |
| Re. 34,331 | 8/1993 | Elings et al. . |
| Re. 34,489 | 12/1993 | Hansma et al. . |
| 4,343,993 | 8/1982 | Binnig et al. . |
| 4,422,002 | 12/1983 | Binnig et al. . |
| 4,520,570 | 6/1985 | Bendnorz et al. . |
| 4,668,865 | 5/1987 | Gimzewski et al. . |
| 4,724,318 | 2/1988 | Binnig . |
| 4,785,177 | 11/1988 | Boecke . |
| 4,800,274 | 1/1989 | Hansma et al. . |
| 4,806,755 | 2/1989 | Duerig et al. . |
| 4,823,004 | 4/1989 | Kaiser et al. . |
| 4,837,435 | 6/1989 | Sakuhara et al. . |
| 4,866,271 | 9/1989 | Ono et al. . |
| 4,868,396 | 9/1989 | Lindsay . |
| 4,871,938 | 10/1989 | Elings et al. . |
| 4,877,957 | 10/1989 | Okada et al. . |
| 4,889,988 | 12/1989 | Elings et al. . |

(List continued on next page.)

FOREIGN PATENT DOCUMENTS

| | | |
|---|---|---|
| 63-85461 | 4/1988 | Japan . |
| 5-203626 | 8/1993 | Japan . |
| 6-59004 | 3/1994 | Japan . |

OTHER PUBLICATIONS

Jung, P.S., et al., "Novel Stationary–Sample Atomic Force Microscope with Beam–Tracking Lens", Electronics Letters, Feb. 4, 1993, vol. 29, No. 3, pp. 264–265.

Joyce, Stephen, A., et al., "Mechanical Relaxation of Organic Monolayer Films Measured by Force Microscopy", Physical Review Letters, May 4, 1992, vol. 68, No. 18, pp. 2790–2793.

Binning, G., et al., "Single–tube three–dimensional scanner for tunneling microscopy", Review of Scientific Instruments, Aug. 1986, vol. 57, No. 8, pp. 1688–1689.

Drake, B., et al., "Imaging Cyrstals, Polymers, and Processes in Water with the Atomic Force Microscope", Science, vol. 243, pp. 1586–1589.

Sonnenfeld, Richard, et al., "Atomic–Resolution Microscopy in Water", Science, Apr. 11, 1986, vol. 232, pp. 211–213.

Davidson, P., et al., "A new symmetric scanning tunneling microscope design", Journal of Vacuum Science & Technology: Part A, Mar./Apr. 1988, No. 2, pp. 380–382.

(List continued on next page.)

Primary Examiner—Daniel S. Larkin
Attorney, Agent, or Firm—Killworth, Gottman, Hagan & Schaeff LLP

[57] ABSTRACT

A force sensing cantilever for use in a scanning probe microscope has both a top side and a bottom side. From the bottom side extends a probe tip. The bottom side is coated with a thin film of a first material and the top side is coated with a thin film of a second material. The first and second materials may be the same or they may be different. The materials and thicknesses of the respective films are selected so as to create opposing forces to counter the tendency of such cantilevers to bend when a thin film is applied to only one side thereof.

25 Claims, 3 Drawing Sheets

U.S. PATENT DOCUMENTS

| | | |
|---|---|---|
| 4,902,892 | 2/1990 | Okayama et al. . |
| 4,914,293 | 4/1990 | Hayashi et al. . |
| 4,924,091 | 5/1990 | Hansma et al. . |
| 4,935,634 | 6/1990 | Hansma et al. . |
| 4,947,042 | 8/1990 | Nishioka et al. . |
| 4,952,857 | 8/1990 | West et al. . |
| 4,954,704 | 9/1990 | Elings et al. . |
| 4,956,817 | 9/1990 | West et al. . |
| 4,962,480 | 10/1990 | Ooumi et al. . |
| 4,968,390 | 11/1990 | Bard et al. . |
| 4,968,914 | 11/1990 | West et al. . |
| 4,969,978 | 11/1990 | Tomita et al. . |
| 4,992,659 | 2/1991 | Abraham et al. . |
| 4,992,728 | 2/1991 | McCord et al. . |
| 4,999,494 | 3/1991 | Elings . |
| 4,999,495 | 3/1991 | Miyata et al. . |
| 5,003,815 | 4/1991 | Martin et al. . |
| 5,009,111 | 4/1991 | West et al. . |
| 5,017,010 | 5/1991 | Mamin et al. . |
| 5,018,865 | 5/1991 | Ferrell et al. . |
| 5,025,658 | 6/1991 | Elings et al. . |
| 5,047,633 | 9/1991 | Finlan et al. . |
| 5,051,646 | 9/1991 | Elings et al. . |
| 5,066,858 | 11/1991 | Elings et al. . |
| 5,077,473 | 12/1991 | Elings et al. . |
| 5,081,390 | 1/1992 | Elings . |
| 5,103,095 | 4/1992 | Elings et al. . |
| 5,107,113 | 4/1992 | Robinson . |
| 5,107,114 | 4/1992 | Nishioka et al. . |
| 5,117,110 | 5/1992 | Yasutake . |
| 5,120,959 | 6/1992 | Tomita . |
| 5,141,319 | 8/1992 | Kajimura et al. . |
| 5,142,145 | 8/1992 | Yasutake . |
| 5,144,128 | 9/1992 | Hasegawa et al. ............ 250/306 |
| 5,144,833 | 9/1992 | Amer et al. . |
| 5,155,361 | 10/1992 | Lindsay . |
| 5,155,715 | 10/1992 | Ueyema et al. . |
| 5,157,251 | 10/1992 | Albrecht et al. . |
| 5,166,516 | 11/1992 | Kajimura . |
| 5,168,159 | 12/1992 | Yagi . |
| 5,189,906 | 3/1993 | Elings et al. . |
| 5,196,713 | 3/1993 | Marshall . |
| 5,198,715 | 3/1993 | Elings et al. . |
| 5,202,004 | 4/1993 | Kwak et al. . |
| 5,204,531 | 4/1993 | Elings et al. . |
| 5,206,702 | 4/1993 | Kato et al. . |
| 5,210,410 | 5/1993 | Barrett ........................ 356/358 |
| 5,224,376 | 7/1993 | Elings et al. . |
| 5,229,606 | 7/1993 | Elings et al. . |
| 5,231,286 | 7/1993 | Kajimura et al. ............ 250/234 |
| 5,237,859 | 8/1993 | Elings et al. . |
| 5,253,516 | 10/1993 | Elings et al. . |
| 5,257,024 | 10/1993 | West . |
| 5,258,107 | 11/1993 | Yoshida et al. ............ 204/129.55 |
| 5,260,567 | 11/1993 | Kuroda et al. ............ 250/227.19 |
| 5,260,622 | 11/1993 | West . |
| 5,260,824 | 11/1993 | Okada et al. ............ 359/368 |
| 5,262,643 | 11/1993 | Hammond et al. . |
| 5,266,801 | 11/1993 | Elings et al. . |
| 5,266,896 | 11/1993 | Rugar et al. ............ 324/307 |
| 5,266,897 | 11/1993 | Watanuki et al. ............ 324/244 |
| 5,267,471 | 12/1993 | Abraham et al. ............ 73/105 |
| 5,274,230 | 12/1993 | Kajimura et al. ............ 250/234 |
| 5,276,324 | 1/1994 | Ohtaki et al. . |
| 5,280,341 | 1/1994 | Nonnemacher et al. . |
| 5,283,437 | 2/1994 | Grescher et al. . |
| 5,283,442 | 2/1994 | Martin et al. . |
| 5,286,977 | 2/1994 | Yokoyama et al. . |
| 5,289,004 | 2/1994 | Okada et al. ............ 250/306 |
| 5,291,775 | 3/1994 | Gamble et al. . |
| 5,293,042 | 3/1994 | Miyamoto . |
| 5,294,804 | 3/1994 | Kajimura . |
| 5,296,704 | 3/1994 | Mishima et al. . |
| 5,298,748 | 3/1994 | Kenny et al. ............ 250/306 X |
| 5,298,975 | 3/1994 | Khoury et al. . |
| 5,304,924 | 4/1994 | Yamano et al. . |
| 5,306,919 | 4/1994 | Elings et al. . |
| 5,307,693 | 5/1994 | Griffith et al. . |
| 5,308,974 | 5/1994 | Elings et al. . |
| 5,314,254 | 5/1994 | Yashar et al. . |
| 5,314,829 | 5/1994 | Coles . |
| 5,317,153 | 5/1994 | Matshshiro et al. . |
| 5,319,960 | 6/1994 | Gamble et al. . |
| 5,319,977 | 6/1994 | Quate et al. ............ 73/606 |
| 5,321,977 | 6/1994 | Clabes et al. ............ 73/105 |
| 5,323,003 | 6/1994 | Shido et al. . |
| 5,324,935 | 6/1994 | Yasutake . |
| 5,325,010 | 6/1994 | Besoeke et al. . |
| 5,329,808 | 7/1994 | Elings et al. . |
| 5,331,589 | 7/1994 | Gambino et al. . |
| 5,338,932 | 8/1994 | Theodore et al. ............ 250/306 |
| 5,354,985 | 10/1994 | Quate ............ 250/234 |
| 5,357,105 | 10/1994 | Harp et al. . |
| 5,360,977 | 11/1994 | Onuki et al. . |
| 5,381,101 | 1/1995 | Bloom et al. ............ 324/676 |
| 5,383,354 | 1/1995 | Doris et al. ............ 73/105 |
| 5,388,452 | 2/1995 | Harp et al. . |
| 5,438,206 | 8/1995 | Yokoyama et al. . |
| 5,461,907 | 10/1995 | Tench et al. ............ 73/105 |
| 5,468,959 | 11/1995 | Tohda et al. ............ 250/306 |
| 5,469,733 | 11/1995 | Yasue et al. ............ 73/105 |
| 5,481,521 | 1/1996 | Washizawa et al. . |
| 5,495,109 | 2/1996 | Lindsay et al. ............ 250/306 |
| 5,497,000 | 3/1996 | Tao et al. . |
| 5,581,083 | 12/1996 | Majumdar et al. ............ 73/105 X |
| 5,594,166 | 1/1997 | Itoh et al. ............ 73/105 |
| 5,670,712 | 9/1997 | Cleveland et al. ............ 73/105 |

OTHER PUBLICATIONS

Marti, O., et al., "Atomic force microscopy of liquid–covered surfaces: Atomic resolution images", Applied Physics Letters, Aug. 17, 1987, vol. 51, No. 7, pp. 484–486.

Kirk, M. D., et al., "Low–temperature atomic force microscopy", Review of Scientific Instruments, Jun. 1988, vol. 59, No. 6, pp. 833–835.

Sonnenfeld, Richard, et al., "Semiconductor topography in aqueous environments: Tunneling microscope of chemomechanically polished (001) GaAs", Applied Physics Letters, Jun. 15, 1987, vol. 50, No. 24, pp. 1742–1744.

Chalmers, S.A., et al., "Determination of tilted superlattice structure by atomic force microscopy", Applied Physics Letters, Dec. 11, 1989, vol. 55, No. 24, pp. 2491–2493.

West, Paul, et al., "Chemical applications of scanning tunneling microscopy", IBM Joint Research Development, Sep. 1986, vol. 30, No. 5, pp. 484490.

Kramar, John Adam, "Candicacy Report", May 21, 1985.

Mate, C. Mathew, et al., "Determination of Lubricant Film Thickness on a Particulate Disk Surface by Atomic Force Microscopy", IBM Research Division, Research Report.

Martin, Y., et al., "Atomic force microscope–force mapping and profiling on a sub 100–Å scale", Journal of Applied Physics, May 15, 1987, vol. 61, No. 10, pp. 4723–4729.

Damaskin, B.B., et al., "The Adsorption of Organic Molecules", Comprehensive Treatise of Electrochemistry, vol. 1: The Double Layer, pp. 353–395.

Travaglini, G., et al., "Scanning Tunneling Microscopy on a Biological Matter", Surface Science, 1987, vol. 181, pp. 380–390.

Ohnesorge, F., et al., "True Atomic Resolution by Atomic Force Microscopy Through Repulsive and Attractive Forces", Science, Jun. 4, 1993, vol. 260, pp. 1451–1456.

Melmed, Allan J., "The art and science and other aspects of making sharp tips", Journal of Vacuum Science & Technology, Mar./Apr. 1991, vol. B9, No. 2, pp. 601–608.

Musselman, Inga Holl, et al., "Plantinum/iridium tips with controlled geometry for scanning tunneling microscopy", Journal of Vacuum Science & Technology, Jul./Aug. 1990, vol. 8, No. 4, pp. 3558–3562.

Ibe, J. P., et al., "On the electrochemical etching of tips for scanning tunneling microscopy", Journal of Vacuum Science & Technology, Jul./Aug. 1990, vol. 8, No. 4, pp. 3570–3575.

Nagahara, L. A., "Preparation and characterization of STM tips for electrochemical studies", Review of Scientific Instruments, Oct. 1989, vol. 60, No. 10, pp. 3128–3130.

Specht, Martin, et al., "Simultaneous measurement of tunneling current and force as a function of position through a lipid film on a solid substrate", Surface Science Letters, 1991, vol. 257, pp. L653–L–658.

Brede, M., et al., "Brittle crack propagation in silicon single crystals", Journal of Applied Physics, Jul. 15, 1991, vol. 70, No. 2, pp. 758–771.

Hu, S.M., "Stress–related problems in silicon technology", Journal of Applied Physics, Sep. 15, 1991, vol. 70, No. 6, pp. R53–R80.

Hansma, P.K., et al., Article (untitled) from Journal of Applied Physics, Jul. 15, 1994, vol. 76, No. 2, pp. 796–799.

Mazur, Ursula, et al., "Resonant Tunneling Bands and Electrochemical Reduction Potentials", Journal of Physical Chemistry.

O'Shea, S.J., et al., "Atomic force microscopy of local compliance at solid–liquid interfaces".

Putman, Constant A.J., et al., "Viscoelasticity of living cells allows high–resolution imaging by tapping mode atomic force microscopy".

Grigg, D.A., et al., "Tip–sample forces in scanning probe microscopy in air and vacuum", Journal of Vacuum Science Technology, Jul./Aug. 1992, vol. 10, No. 4, pp. 680–683.

Lindsay, S.M., et al., "Scanning tunneling microscopy and atomic force microscopy studies of biomaterials at a liquid–solid interface", Journal of Vacuum Science Technology, Jul./Aug. 1993, vol. 11, No. 4, pp. 808–815.

Jarvis, S.P., et al., "A novel force microscope and point contact probe", Review of Scientific Instruments, Dec. 1993, vol. 64, no. 12, pp. 3515–3520.

Stewart, A.M., et al., "Use of magnetic forces to conttol distance in a surface force apparatus".

Marti, O., et al., "Control electronics for atomic force microscopy", Review of Scientific Instruments, Jun. 1988, vol. 59, No. 6, pp. 836–839.

CANTILEVERS FOR A MAGNETICALLY DRIVEN ATOMIC FORCE MICROSCOPE

CROSS-REFERENCE TO RELATED APPLICATIONS

This application is a continuation-in-part of U.S. patent application Ser. No. 08/553,111 filed 7 Nov. 1995 in the name of inventor Stuart M. Lindsay now U.S. Pat. No. 5,612,491, which is, in turn, a division of U.S. patent application Ser. No. 08/403,238 filed 10 Mar. 1995 in the name of inventor Stuart M. Lindsay, now U.S. Pat. No. 5,513,518, which is, in turn, a continuation-in-part of U.S. patent application Ser. No. 08/246,035 filed 19 May 1994 in the name of inventor Stuart M. Lindsay, now U.S. Pat. No. 5,515,719. The disclosures of each of the foregoing are hereby incorporated herein by reference as if set forth in full herein.

BACKGROUND OF THE INVENTION

1. Field of the Invention

This invention relates to scanning probe microscopy, and in particular to the preparation of force-sensing cantilevers for use in scanning probe microscopy and atomic force microscopy.

2. The Prior Art

In a conventional atomic force microscope or AFM, the deflection of a flexible cantilever is used to monitor the interaction between a probe tip disposed on an end of the cantilever and a surface under study. As the probe tip is brought close to the surface, it deflects in response to interactions with the surface under study. These deflections are used to control the distance of the tip from the surface and to measure details of the surface as explained, for example, in "Atomic Force Microscope", G. Binnig, C. F. Quate and C. Gerber, Physical Review Letters, Vol. 56, No. 9, pp. 930–933 (1986).

It is often desirable to operate an atomic force microscope in an oscillating mode—this is referred to in the art as the "AC mode". In the AC mode, the cantilever is vibrated at a high frequency (typically somewhere in the range of about 1 kHz to about 100 kHz), and the change in amplitude of the physical oscillations of the cantilever or phase of those oscillations with respect to the driving signal as the cantilever approaches a surface under study is used to control the microscope as explained, for example, in "Frequency Modulation Detection Using High-Q Cantilevers for Enhanced Force Microscopy Sensitivity", T. R. Albrecht, P. Gruitter, D. Horne and D. Rugar, Journal of Applied Physics, Vol. 69, pp. 668–673 (1991). One reason for using the AC mode to vibrate the cantilever is that by doing this, when oscillated at high amplitude, the probe tip is less likely to stick to the surface under study if it should come into contact with it. This is explained, for example, in "Fractured Polymer/Silica Fibre Surface Studied by Tapping Mode Atomic Force Microscopy", Q. Zhong, D. Inniss, K. Kjoller and V. B. Elings, Surface Science Letters, Vol. 290, pp. L688–L692 (1993). However, the AC mode of operation is also intrinsically more sensitive than other known methods of operating an atomic force microscope. AC detection shifts the signal to be detected to sidebands on a carrier signal, avoiding the low frequency noise that DC signals suffer from. In addition, the mechanical "Q" of a cantilever resonance can be used to enhance the overall signal to noise ratio of a microscope operated in this fashion as explained in "Frequency Modulation Detection Using High-Q Cantilevers for Enhanced Force Microscopy Sensitivity", T. R. Albrecht, P. Grütter, D. Horne and D. Rugar, Journal of Applied Physics, Vol. 69, pp. 668–673 (1991).

One version of an AC mode operated atomic force microscope, where contact between the probe tip and the surface under study is actually sought out, is described in U.S. Pat. No. 5,412,980 to V. Elings and J. Gurley entitled "Tapping Atomic Force Microscope" and in U.S. Pat. No. 5,519,212 to V. Elings and J. Gurley entitled "Tapping Force Microscope with Phase or Frequency Detection". In this version, where the oscillatory mode of operation is referred to as the "tapping mode" for the fact that it actually repeatedly taps at the surface under study, the oscillation is used mainly as a means of avoiding the effects of adhesion between the probe tip and the surface being "tapped". It has also been discovered that such adhesion may easily be overcome by chemical means. For example, the microscope may be operated in a fluid which minimizes adhesion. Alternatively (or additionally) a tip material may be chosen so as to minimize its adhesion to the surface under study. Where such techniques are used to reduce adhesive forces, there is no longer any reason to operate the atomic force microscope at a large oscillation amplitudes.

The usual method of exciting motion in the cantilever of an atomic force microscope is to drive it with an acoustic excitation. This method works well in air or gas and has been made to work with the tip submerged in water. See, for example, "Tapping Mode Atomic Force Microscopy in Liquids", P. K. Hansma, J. P. Cleveland, M. Radmacher, D. A. Walters, P. E. Hilner, M. Bezanilla, M. Fritz, D. Vie, H. G. Hansma, C. B. Prater, J. Massie, L. Fukunaga, J. Gurley and V. B. Elings, Applied Physics Letters, Vol. 64, pp. 1738–1740 (1994) and "Tapping Mode Atomic Force Microscopy in Liquid", C. A. J. Putman, K. 0. V. d. Werf, B. G. deGrooth, N. F. V. Hulst and J. Greve, Applied Physics Letters, Vol. 64, pp. 2454–2456 (1994). However, in a fluid, the motions of the cantilever become viscously damped, so that substantial acoustic amplitude is required to drive and sustain the desired oscillatory motion of the cantilever. Furthermore, the fluid acts as a coupling medium between the source of acoustic excitation and parts of the microscope other than the cantilever. The result of this undesired coupling is that parts of the microscope other than the cantilever get excited into motion by the acoustic signal used to vibrate the cantilever. If such motion leads to a signal in the detector, a background signal is generated which is spurious and not sensitive to the interaction between the tip and surface as explained in "Atomic Force Microscope with Magnetic Force Modulation", E. L. Florin, M. Radmacher, B. Fleck and H. E. Gaub, Review of Scientific Instruments, Vol. 65, pp. 639–643 (1993). S. M. Lindsay and co-workers have described a scheme for exciting the cantilever directly while avoiding unwanted mechanical coupling of an oscillatory signal into the larger structure of the atomic force microscope. This is described at, for example, "Scanning Tunneling Microscopy and Atomic Force Microscopy Studies of Biomaterials at a Liquid—Solid Interface", S. M. Lindsay, Y. L. Lyubchenko, N. J. Tao, Y. Q. Li, P. I. Oden, J. A. DeRode and J. Pan, Journal of Vacuum Science Technology A, Vol. 11, pp. 808–815 (July/August 1993). In this approach, a magnetic particle or film is attached to the cantilever and a solenoid near the cantilever is used to generate a controlled magnetic force on the cantilever. This arrangement gives extreme sensitivity to surface forces as discussed in "Atomic Force Microscopy of Local Compliance at Solid—Liquid Interfaces", S. J. O'Shea, M. E. Welland and J. B. Pethica, Chemical Physical Letters, Vol. 223, pp. 336–340 (1994), presumably because of a lack of the background spurious signals that would normally be present in an acoustically-excited atomic force microscope. It is the basis of a novel form of AC-AFM in which the cantilever is excited by magnetic means (see, for example, U.S. Pat. No. 5,515,719 entitled "Controlled Force Microscope for Operation in Liquids" to S. M. Lindsay and U.S. Pat. No. 5,513,518 entitled "Magnetic Modulation of Force Sensor for AC Detection in an Atomic Force Microscope" to S. M. Lindsay).

Magnetic cantilevers are required in order to operate such a microscope. Three approaches have been used. First, Lindsay et al. described a method for fixing a magnetic particle onto the cantilever ("Scanning Tunneling Microscopy and Atomic Force Microscopy Studies of Biomaterials at a Liquid—Solid Interface", S. M. Lindsay, Y. L. Lyubchenko, N. J. Tao, Y. Q. Li, P. I. Oden, J. A. DeRode and J. Pan, Journal of Vacuum Science Technology, Vol. 11, pp. 808–815 (1993)). This method, however, does not readily permit fabrication of suitable cantilevers in quantity. Second, O'Shea et al. ("Atomic Force Microscopy of Local Compliance at Solid—Liquid Interfaces", S. J. O'Shea, M. E. Welland and J. B. Pethica, Chemical Physical Letters, Vol. 223, pp. 336–340 (1994)) describe a method for evaporating a magnet coating onto the cantilever. In order to avoid bending the cantilever due to the interfacial stress introduced by the evaporated film, they place a mask over most of the cantilever so that the magnetic film is deposited only onto the tip of the force-sensing cantilever. This approach requires precision alignment of a mechanical mask and it is not conducive to simple fabrication of suitable coated cantilevers. Third, in an earlier invention by one of the present inventors (S. M. Lindsay, U.S. patent application Ser. No. 08/553,111 entitled "Formation of a Magnetic Film on an Atomic Force Microscope Cantilever") methods for coating cantilevers with magnetic films and for calibrating the properties of the films were described. However, while suited for its intended purposes, the yield of cantilevers produced by this process was not as high as desired as some of the cantilevers coated on one side only were manufactured with unacceptable bends or deformations.

Magnetic cantilevers have also been manufactured for the purpose of magnetic force microscopy, an imaging process which is used to sense local magnetization in materials such as magnetic recording media and recording heads. Grütter et al. (P. Grütter, D. Rugar, H. J. Mamin, G. Castillo, S. E. Lambert, C. J. Lin, R. M. Valletta, O. Wolter, T. Bayer and J. Greschner, "Batch Fabricated Sensors for Magnetic Force Microscopy", Applied Physics Letters, Vol. 57, No. 17, pp. 1820–1822, 22 Oct. 1990) describe a method for coating silicon cantilever probe tips with thin (15 nm) films of Cobalt, Cobalt alloys (Co/Pt/Cr) and Permalloy (Ni/Fe). These devices are typically 500 $\mu$m long, 11.5 $\mu$m wide, 5–7 $\mu$m thick with a spring constant on the order of 1 N/m and resonant frequencies of about 35 kHz. Babcock et al. (K. Babcock, V. Elings, M. Dugas and S. Loper, "Optimization of Thin-Film Tips for Magnetic Force Microscopy", I.E.E.E. Transactions on Magnetics, Vol. 30, No. 6, pp. 4503–4505, November, 1994) describe sputtering thin films (500 Å) of Cobalt alloy (Co/Cr) onto the probe tips of silicon cantilevers having lengths of 225 $\mu$m widths of 27 $\mu$m, thickness of 3 $\mu$m, resonant frequencies of 92.4 kHz and spring constants of about 5 N/m . In each case, only the probe tip side of the cantilever was coated with the thin film. While suited for the task of Magnetic Force Microscopy, silicon cantilevers are expensive to fabricate and the yield is substantially lower than the yield for silicon nitride cantilevers. Silicon cantilevers are also generally much stiffer than silicon nitride cantilevers (with corresponding spring constants of about 50 N/m for silicon and less than 1 N/m for silicon nitride) and these "softer" cantilevers are desirable for imaging soft samples such as biological samples and the like. Silicon nitride cantilevers, however, suffer from the drawback that, because they are soft, they are easily bent upon being coated with a sputtered film.

Accordingly, it would be desirable to provide a magnetic cantilever and method for fabricating the same which results in higher yields and more ready manufacturability than heretofore available while inducing minimum bending and without requiring precision masks to cover parts of the cantilevers during deposition of a magnetic film.

OBJECTS AND ADVANTAGES OF THE INVENTION

Accordingly, it is an object and advantage of the present invention to provide a scanning probe microscope force sensing cantilever coated with a magnetic film.

It is another object and advantage of the present invention to provide an improved method for manufacturing a scanning probe microscope force sensing cantilever coated with a magnetic film.

It is a further object and advantage of the present invention to provide a method of coating a force-sensing cantilever of an atomic force microscope with an adequate amount of magnetic material without causing bending or permanent distortion of the cantilever.

It is a further object and advantage of the present invention to provide an atomic force microscope probe cantilever having as large a magnetic moment as possible, so that a solenoid will drive the cantilever alone into desired motion without driving other parts of the microscope into motion that might respond to a magnetic field induced by the solenoid.

It is a further object and advantage of the present invention to provide an improved method of fabrication of an atomic force microscope probe cantilever having as large a magnetic moment as possible, so that a solenoid will drive the cantilever alone into desired motion without driving other parts of the microscope into motion that might respond to a magnetic field induced by the solenoid.

It is a further object and advantage of the present invention to provide a method of coating a silicon nitride cantilever with a magnetic coating without causing undue bending of the cantilever.

It is a further object and advantage of the present invention to provide a scanning probe microscope force sensing cantilever having a first side coated with a magnetizable material and a second side coated with a non-magnetizable material.

Yet another object and advantage of the present invention is to provide a magnetic coating and a method of depositing same onto a force sensing cantilever of an atomic force microscope, the magnetic coating being stable during repeated scanning of the cantilever in fluids.

These and many other objects and advantages of the present invention will become apparent to those of ordinary skill in the art from a consideration of the drawings and ensuing description of the invention.

SUMMARY OF THE INVENTION

A force sensing cantilever for use in a scanning probe microscope has both a top side and a bottom side. From the bottom side extends a probe tip. The bottom side is coated with a thin film of a first material and the top side is coated with a thin film of a second material. The first and second materials may be the same or they may be different. The materials and thicknesses of the respective films are selected so as to create opposing forces to counter the tendency of such cantilevers to bend when a thin film is applied to only one side thereof.

In one embodiment of the invention, where the first and second materials are different, the second material comprises a magnetizable material. In another embodiment of the invention, where the first and second materials are different and the second material comprises a magnetizable material, the first material is not a magnetizable material.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Adequate magnetic moments for atomic force microscope probe cantilevers are achieved with films of a few hundred Angstroms of rare-earth magnetic alloys (magnetic materials), such as Neodymium-Iron-Boron (Nd/Fe/Bo). Other magnetic alloys with suitable moments are samarium cobalt and Alnico, an alloy of aluminum, nickel, and cobalt. They may be used in combination, if desired. Such materials are readily capable of magnetization in the presence of a magnetic field of sufficient magnitude. The cantilevers are typically 100 microns long and 20 to 50 microns wide. It is therefore not practical to put a layer onto them that is much thicker than a few tenths of a micron, since the thickness of the cantilevers is only on the order of a few microns. Thus, the volume of material that can be deposited is limited to $10^{-16}$ m$^3$ or so. As will be seen, it is desirable to obtain a magnetic moment of at least $10^{-10}$ A-m$^2$ (amperes/square meter). The materials described above have remnant magnetizations, B$_r$, on the order of $10^6$ A/m so that the magnetic moment that can be obtained is on the order of $10^6 \times 10^{-16}$ A-m$^2$ or $10^{-10}$ A-m$^2$ as desired.

In accordance with the present invention, magnetic material is formed into a sputter target for use in a sputter deposition system similar to those used in the semiconductor industry for the deposition of metallic films onto silicon wafers. A target is further prepared by heating the magnetic material above its Curie temperature in order to destroy and randomize its permanent magnetic field. For Nd/Fe/Bo, the Curie Temperature is 310° C. This randomization is carried out because it is desired to program the magnetic force vector of the cantilever in a desired direction after fabrication of the cantilever. For example, where the cantilever is disposed in a plane and a solenoid positioned above or below the plane interacts with the cantilever in a direction orthogonal to the plane as is the usual case, it is generally desirable to magnetize the cantilever in a direction parallel to the plane in which the cantilever is oriented so as to maximize the torque generated by interaction between the cantilever and the solenoid, similar to the operation of an electric induction motor. Alternatively, the cantilever can be magnetized to take advantage of the weaker force of interaction due to field gradients of the applied magnetic field from the solenoid. On cooling, the target assembly is useable in a conventional DC sputtering system, such as a diode, triode, or magnetron deposition system, although those of ordinary skill in the art would easily be able to carry out the process in other systems such as electron beam evaporators or RF sputtering systems or other systems commonly used for the deposition of metallic films.

Once the film is deposited, the important next step in the preparation of the cantilevers is the formation of a controlled magnetic moment. One method for doing this is to place the cantilever in a strong magnetizing field. According to a presently preferred embodiment of the present invention, a film is evaporated onto the cantilever surface. Such films are relatively easy to magnetize in the plane of the film. The magnetization can be monitored by simultaneous preparation of a film on a test substrate such as a wafer of silicon. The cantilever is coated with a magnetic film and is placed between the pole pieces of an electromagnet with its soft axis lying along the field direction. Magnetization of the thin film can be monitored using a separate test specimen, consisting of a silicon wafer coated with an identical thin magnetic film. A laser beam from an ellipsometer is used to measure the local magnetization using rotation of the polarization of the incident light. The magnetic field is swept as the magnetization of the film is recorded. It shows the characteristic hysteresis loop due to the permanent magnetization of the sample at a saturation magnetization M$_s$ which occurs at a saturating field Hs.

As discussed before, films of the alloys disclosed herein have a remnant magnetization on the order of $10^6$ A/m, so that a coating of volume $10^{-16}$ m$^3$ has a magnetic moment of $10^{-10}$ A-m$^2$. A practical magnetic field produced by a small solenoid suitable for insertion into the microscope is about $10^{-3}$ T (tesla) resulting in a torque on the cantilever of $10^{-13}$ Nm (newton meters) if the field is oriented perpendicular to the magnetization direction of the cantilever. This is equivalent to a force of $10^{-9}$N on the end of a cantilever of length $10^{-4}$ m. Such a cantilever with a spring constant of 0.1 N/m would deflect by 10 nm.

Thus, the degree of control is adequate not only for applying modulation to the cantilever (where displacements of 0.01 nm are adequate) but also for controlling instabilities in the cantilever position caused by attractive forces which pull the cantilever into the surface. This is described more fully in U.S. Pat. No. 5,515,719 entitled "Controlled Force Microscope for Operation in Liquids" and in U.S. Pat. No. 5,513,518 entitled "Magnetic Modulation of Force Sensor for AC Detection in an Atomic Force Microscope".

Figure 1:
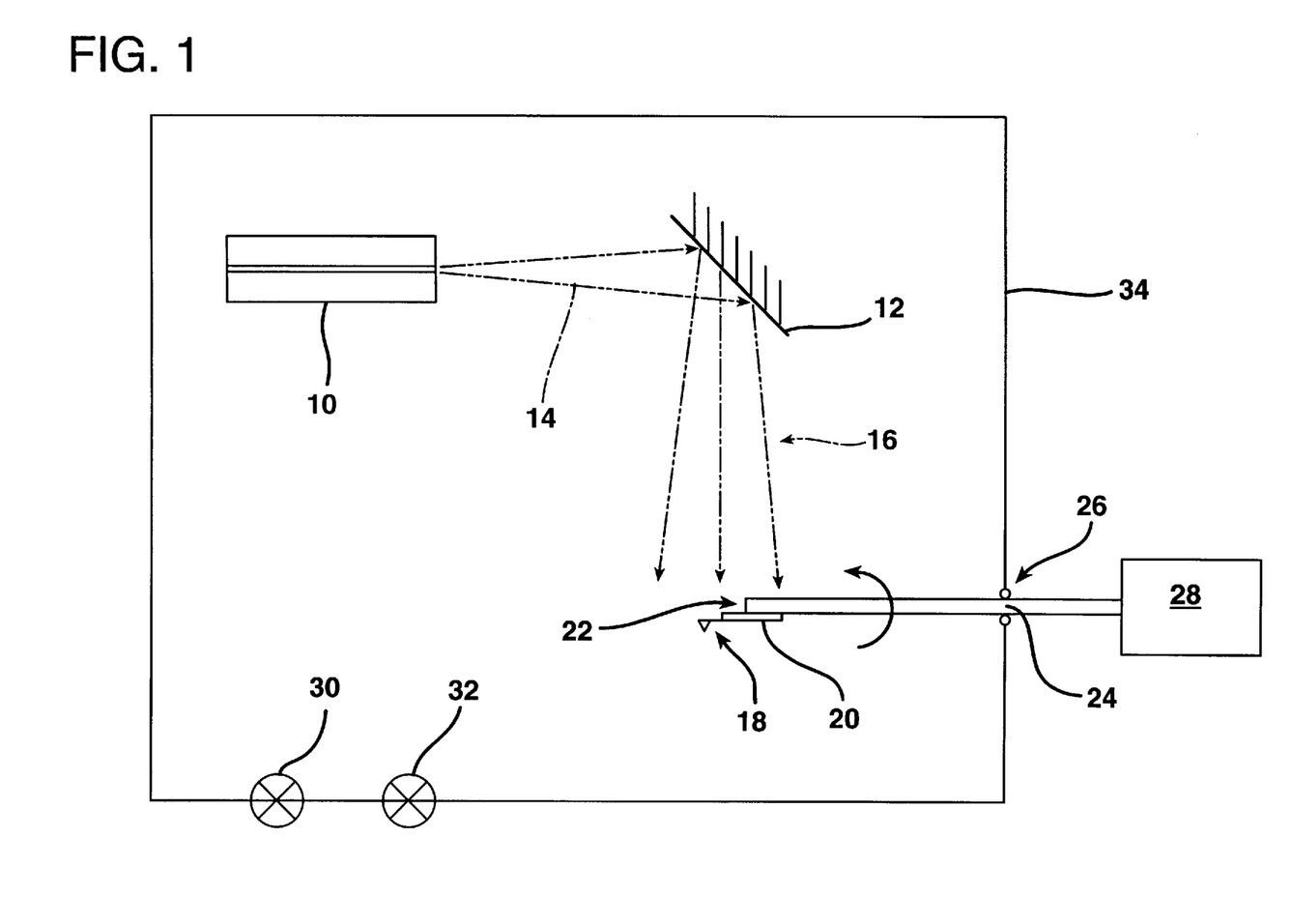
FIG. 1 is a schematic diagram showing how a magnetic film is sputtered onto a rotatable cantilever.

In one presently preferred system for coating an atomic force microscope cantilever with a magnetic material, the cantilever is mounted in a holder or other apparatus capable of rotating the cantilever inside the vacuum system of a sputter deposition system. It is then rotated under the target so that both sides are evenly coated with magnetic material as illustrated in FIG. 1. Turning to FIG. 1, an ion-gun 10 directs a stream of argon-ions at a target 12 which includes a rare-earth magnetic alloy that has been de-Gaussed. Ion beam 14 from ion gun 10 impinges on target 12 causing the ejection of a stream of magnetic particles 16 from target 12 which are incident upon the object 18 being coated sample which may be one or more cantilevers. These cantilevers are mounted on an object holder 20 on the end 22 of a rotating rod 24 which passes through a vacuum seal 26 so it can be rotated by hand or with the use of a motor 28 outside the vacuum system. A first valve system 30 is connected to a vacuum system (not shown) which may be a cryo pump or other vacuum source as well known to those of ordinary skill in the art. A second valve system 32 is connected to a source of inert gas (here, preferably argon) used for initiating the sputtering and controls the flow of argon into deposition chamber 34 in a conventional manner. The object 18 is rotated many times during the course of deposition of the film. For example, as presently preferred, if a 1500 Å thick film is deposited over the course of 20 minutes, the sample may be rotated once each minute.

This method of deposition results in cantilevers which are not bent, but suffers the drawback that the magnetic material is generally not highly durable as a tip material for scanning a surface in an atomic force microscope. It is also difficult to extend this method to large-area samples such as a whole four-inch diameter wafer of microfabricated cantilevers.

Figure 2A:
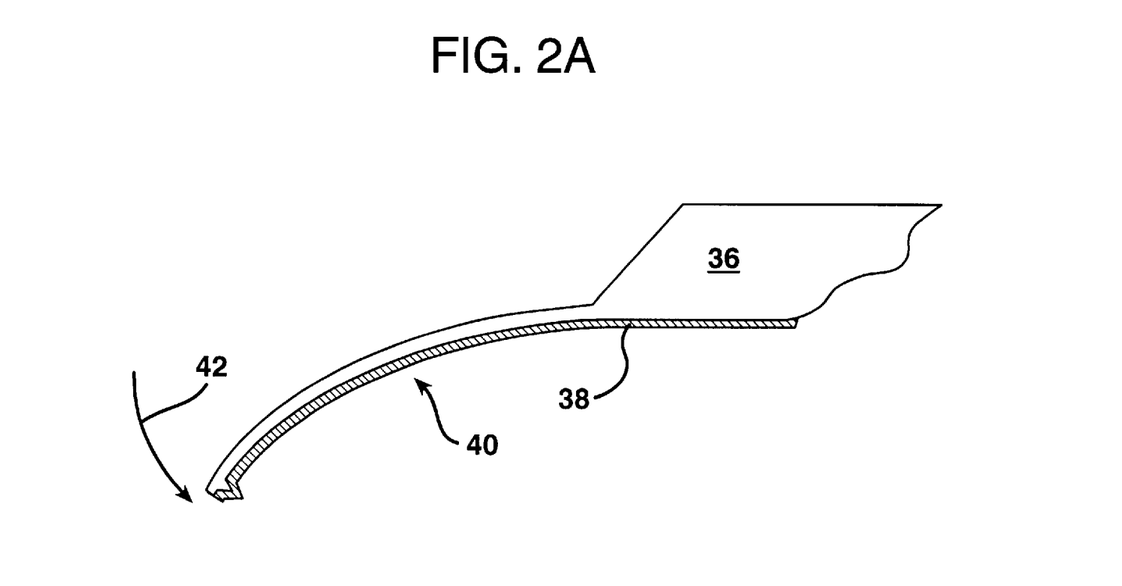
FIG. 2A is a diagram showing how the application of a metal film on the underside of a cantilever causes an undesirable bend in the cantilever.
Figure 2B:
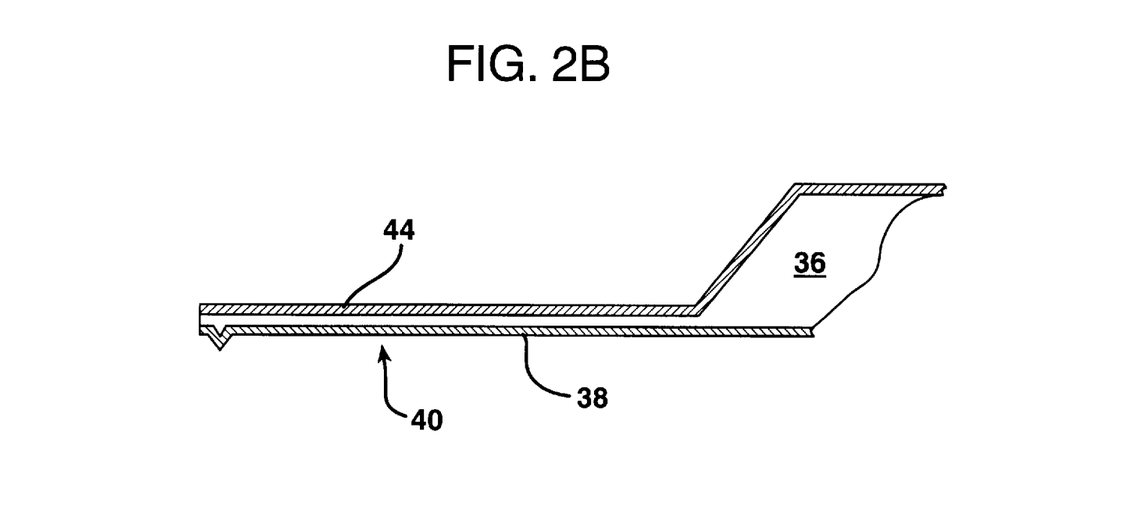
FIG. 2B is a diagram showing how the bend of FIG. 2A is compensated for by the application of a second film on the opposing side.

An improvement results when one material is used to coat the scanning tip side, resulting in bending in one direction. The final deposition of the magnetic layer on the opposite side applies a compensatory bending so that the final cantilever is straight. Clearly, this process could be carried out in any order. For example, the top (magnetic) side could be coated first and the bottom (non-magnetic) side coated subsequently. The process could even be carried out in alternating steps. The method of the preferred embodiment is shown in FIGS. 2A and 2B. In FIG. 2A a cantilever assembly 36 is coated with a 200 Å layer of chrome (Cr) 38 on the underside (the tip side) 40 resulting in bending in the direction shown by the arrow 42. The sample is then rotated by 180 degrees and a second coating 44 (FIG. 2B) of a rare-earth magnetic material placed onto the top side (opposite to the tip). In the case just illustrated, a 1500 Å layer of a Nd/Fe/Bo magnetic alloy will exactly compensate the bending introduced by the 200 Å layer of chrome (Cr) 38.

Figure 3:
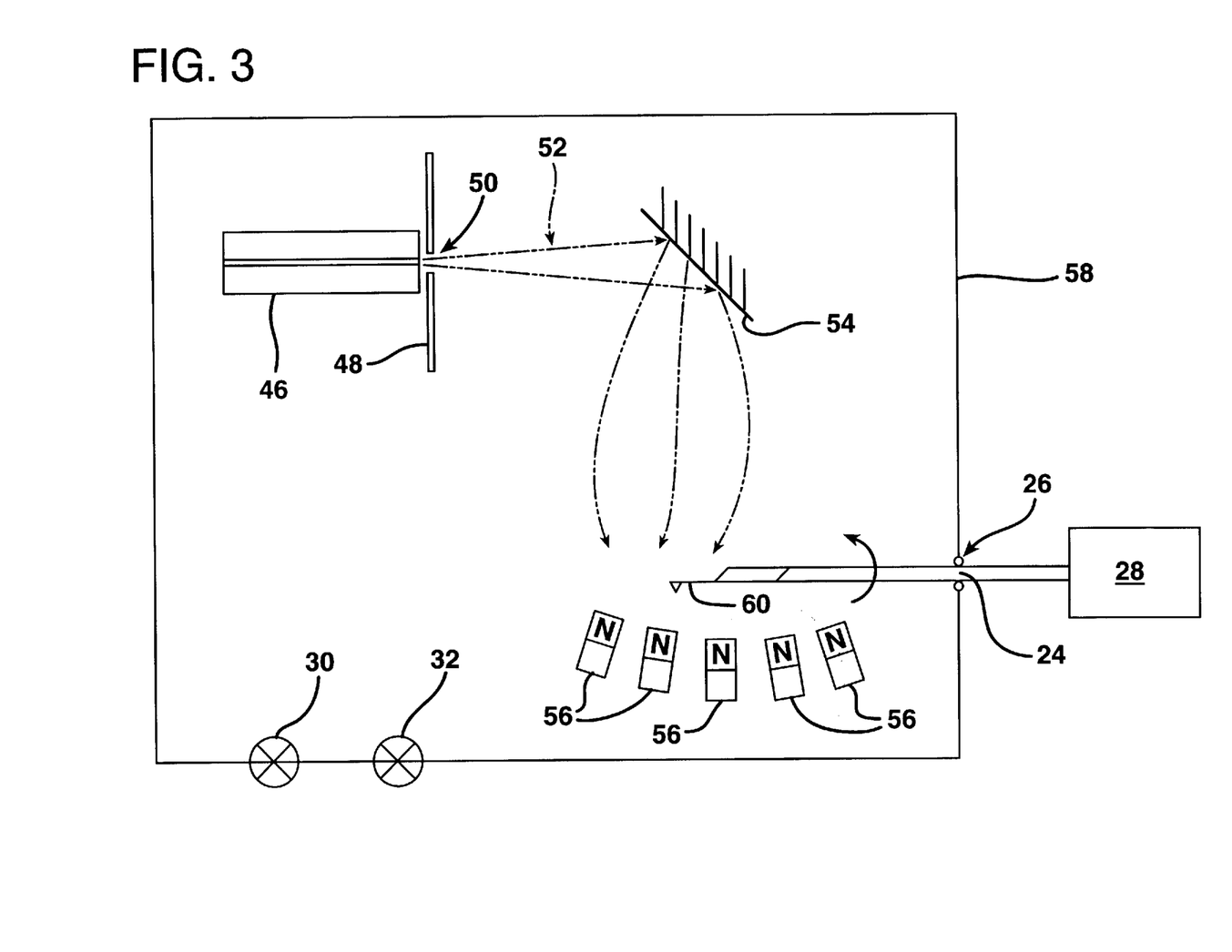
FIG. 3 is a schematic diagram showing how magnetic components in a sputtering system can be protected from contamination both by screening and by placement of scavenging magnets.

The use of a magnetic alloy in a sputtering system causes problems in the event that magnetic materials are used in the sputtering system. Ion guns with magnetic focusing elements can be protected with a shielding material such as mu-metal as shown in FIG. 3. The ion gun 46 is screened with a mu-metal shield 48 which contains an aperture 50 through which an ion beam 52 or argon ions can escape directed toward target 54. It is extremely unlikely that the diffuse spray of material from the target 54 will find its way back to ion gun 46. Small permanent magnets 56 can be placed around the vacuum chamber 58, and, by adjustment of their position, it is possible to optimize the uniformity of the deposited magnetic film on the object 60 as well as to scavenge stray magnetic material which otherwise might contaminate other parts of the system.

According to a presently preferred embodiment of the present invention, silicon nitride "Microlever" force sensing cantilevers available from Park Scientific of Sunnyvale, Calif. are coated in a Gatan Model 681 High Resolution Ion Beam Coater available from Gatan Corporation of Pleasanton, Calif. This is a two gun system with a diaphragm and turbo pump and liquid nitrogen trap. The cantilevers sit about 3 cm below the targets and two rows of three cantilever chips are coated in one session (the total coating area is about 0.25 sq. cm.). The system is pumped down to better than $10^{-7}$ Torr with liquid nitrogen placed in the cold trap. The system is then flushed with argon gas for two hours until stable ion beam currents are obtained. Sputtering is carried out by setting the beam current to 400 microamperes at each gun by adjusting the gas flow rate into each gun (i.e., total current of 800 microamperes). The accelerating voltage used is 9.9 kVDC. The targets can be switched in situ.

The underside (tip-side) of the cantilevers is first coated with 200 Å of chromium (Cr) at a deposition rate of 1.2 Å/sec. Cr is a non-magnetic material. The cantilevers are then rotated 180 degrees and the top side is then coated with approximately 1500 Å of material sputtered from an Fe/Bo/Nd magnet used as a target at a deposition rate of 0.9 Å/sec. The magnetic film is then covered with a protective gold (Au) film of thickness 200 Å deposited at a rate of 3.2 Å/sec.

Preferably, the system is pulled apart and cleaned between each session to remove magnetic material accumulated on the gun magnets and Penning (pressure) gauge.

The above described process has been used on commercially available silicon nitride force sensing cantilevers available from Park Scientific of Sunnyvale, Calif. under the trade name "Microlevers" with no evidence of bending.

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A force sensing cantilever for use in a scanning probe microscope, said cantilever comprising:

a cantilever structure having a top side and a bottom side, said bottom side including a probe tip disposed downwardly therefrom;

a film of a first material which is not magnetizable disposed over said bottom side and said probe tip; and a film of a second material which is magnetizable disposed over said top side, and wherein said first material is different from said second material, said first and second materials and the thicknesses of the respective films being selected so as to counter the tendency of said cantilever structure to bend when a film is applied only to one side thereof.

2. A cantilever according to claim 1 in which said cantilever structure comprises silicon nitride.

3. A cantilever according to claim 1 wherein said second material comprises Nd/Fe/Bo.

4. A force sensing cantilever for use in a scanning probe microscope, said cantilever comprising:

a cantilever structure having a top side and a bottom side, said bottom side including a probe tip disposed downwardly therefrom;

a film of a first material comprising Cr which is not magnetizable disposed over said bottom side and said probe tip; and a film of a second material which is magnetizable disposed over said top side, and wherein said first material is different from said second material.

5. A cantilever according to claim 4 wherein said second material comprises Nd/Fe/Bo.

6. A method of fabricating a force sensing cantilever for a scanning probe microscope comprising the steps of:

forming a cantilever structure having a top side, a bottom side, and a probe tip extending downwardly from said bottom side;

placing the cantilever in a sputter deposition chamber;

sputter depositing a first material which is not a magnetizable material onto the bottom side of the cantilever to form a film of said first material; and sputter depositing a second material which is magnetizable onto the top side of the cantilever to form a film of said second material, said first and second materials and the thicknesses of the respective films being selected so as to counter the tendency of said cantilever structure to bend when a film is applied only to one side thereof.

7. A method according to claim 6 wherein said first material and said second material are different.

8. A method according to claim 7 further comprising the step of:

magnetizing the cantilever in a selected direction.

9. A method according to claim 6 further comprising the step of:

magnetizing the cantilever in a selected direction.

10. A method of fabricating a force sensing cantilever for a scanning probe microscope comprising the steps of:

forming a cantilever structure having a top side, a bottom side and a probe tip extending downwardly from said bottom side;

placing the cantilever in a sputter deposition chamber;

selecting a non-magnetic material and thin film thickness to counter the bending force that will be applied by a deposited film of a selected magnetic material;

sputter depositing said non-magnetic material onto the bottom side of the cantilever to said selected thickness; and sputter depositing said selected magnetic material onto the top side of the cantilever.

11. A method according to claim 10 wherein said cantilever comprises silicon nitride.

12. A method according to claim 11 wherein said non-magnetic material comprises Cr.

13. A method according to claim 12 wherein said magnetic material comprises a rare-earth magnetic alloy.

14. A method according to claim 13 wherein said rare-earth magnetic alloy comprises Nd/Fe/Bo.

15. A method according to claim 13 wherein said magnetic material comprises an alloy selected from the group consisting of: Nd/Fe/Bo, samarium cobalt, aluminum nickel cobalt, and combinations of the foregoing.

16. A force sensing cantilever for use in a scanning probe microscope, said cantilever comprising:

a cantilever structure with a spring constant of less than 1 N/m and having a top side and a bottom side, said bottom side including a probe tip disposed downwardly therefrom;

a film of a first material which is not magnetizable disposed over said bottom side and said probe tip; and a film of a second material which is magnetizable disposed over said top side, and wherein said first material is different from said second material, said first and second materials and the thicknesses of the respective films being selected so as to counter the tendency of said cantilever structure to bend when a film is applied only to one side thereof.

17. A cantilever according to claim 16 in which said cantilever structure comprises silicon nitride.

18. A cantilever according to claim 16 wherein said second material comprises a rare earth magnetic material comprising alloys selected from the group consisting of: Nd/Fe/Bo, samarium cobalt, aluminum nickel cobalt, and combinations of the foregoing.

19. A method of fabricating a force sensing cantilever for a scanning probe microscope comprising the steps of:

forming a cantilever structure having a spring constant of less than 1 N/m, a top side, a bottom side, and a probe tip extending downwardly from said bottom side;

placing the cantilever in a sputter deposition chamber;

sputter depositing a first material which is not magnetizable onto the bottom side of the cantilever to form a film of said first material; and sputter depositing a second material which is magnetizable onto the top side of the cantilever to form a film of said second material, wherein said first and second materials are different and the thicknesses of the respective films are selected so as to counter the tendency of said cantilever structure to bend when a film is applied only to one side thereof.

20. A method according to claim 19 further comprising the step of:

magnetizing the cantilever in a selected direction.

21. A method of fabricating a force sensing cantilever for a scanning probe microscope comprising the steps of:

forming a cantilever structure having a spring constant of less than 1 N/m, a top side, a bottom side, and a probe tip extending downwardly from said bottom side;

placing the cantilever in a sputter deposition chamber;

selecting a non-magnetic material and thin film thickness to counter the bending force that will be applied by a deposited film of a selected magnetic material;

sputter depositing said non-magnetic material onto the bottom side of the cantilever to said selected thickness; and sputter depositing said selected magnetic material onto the top side of the cantilever.

22. A method according to claim 21 wherein said cantilever comprises silicon nitride.

23. A method according to claim 22 wherein said non-magnetic material comprises Cr.

24. A method according to claim 23 wherein said magnetic material comprises a rare-earth magnetic alloy.

25. A method according to claim 24 wherein said rare-earth magnetic alloy comprises a material selected from the group consisting of: Nd/Fe/Bo, samarium cobalt, aluminum nickel cobalt, and combinations of the foregoing.

* * * * *